United States Patent [19]

Domine et al.

[11] Patent Number: 4,888,391

[45] Date of Patent: Dec. 19, 1989

[54] PAINTABLE THERMOPLASTIC POLYOLEFIN COMPOSITIONS HAVING IMPROVED FLEXURAL PROPERTIES

[75] Inventors: Joseph D. Domine, Humble; Anton J. Buchner, Houston, both of Tex.

[73] Assignee: Exxon Chemical Patents Inc., Linden, N.J.

[21] Appl. No.: 231,569

[22] Filed: Aug. 12, 1988

[51] Int. Cl.$^4$ .................. C08L 3/16; C08L 23/10; C08L 33/02; C08L 33/06

[52] U.S. Cl. .................. 525/221; 525/211; 525/227

[58] Field of Search .................. 525/221, 211

[56] References Cited

U.S. PATENT DOCUMENTS

| | | | |
|---|---|---|---|
| 3,249,570 | 5/1966 | Potts et al. ............... | 525/221 |
| 3,410,928 | 11/1968 | Baum ....................... | 525/221 |
| 4,277,578 | 7/1981 | Yoshimura et al. ......... | 525/211 |
| 4,420,580 | 12/1983 | Herman et al. ............ | 524/424 |
| 4,433,073 | 2/1984 | Sano et al. ................ | 523/201 |

FOREIGN PATENT DOCUMENTS

WO86/04912  8/1986  World Int. Prop. O.

Primary Examiner—Carman J. Seccuro
Attorney, Agent, or Firm—J. F. Hunt

[57] ABSTRACT

A polyolefin composition of ethylene, propylene, or copolymers thereof having good paint retention and improved flexural modulus is described. The properties result from incorporation into said polyolefin of a discontinuous phase made up of an ethylene/lower alkyl (meth)acrylate/(meth)acrylic acid terpolymer. This composition is particularly useful for molding paintable auto parts.

11 Claims, No Drawings

PAINTABLE THERMOPLASTIC POLYOLEFIN COMPOSITIONS HAVING IMPROVED FLEXURAL PROPERTIES

BACKGROUND OF THE INVENTION

The present invention relates generally to thermoplastic polyolefin compositions and, more particularly, to paintable thermoplastic polyolefin ("TPO") blends having a reduced flexural modulus and good paint retention while maintaining desirable impact resistance and tensile strength.

TPO generally refers to a wide range of olefin-based compositions or blends having many uses. Physical properties can be varied widely by adjusting the relative proportions of components.

Typical TPOs contain polypropylene, polyolefin rubbers, and optionally other ethylene copolymers. A particular example of a TPO comprises a melt blend or like mixture of a polypropylene resin with an ethylene-propylene rubbery polymer. The polypropylene resin imparts rigidity and temperature resistance to the TPO while the ethylene-propylene rubbery polymer imparts flexibility as well as toughness. Often, however, a lower flexural modulus is required than can be achieved without loss of other physical properties. TPOs such as those described above find particular application as rubber substitutes in the automotive industry in, for example, flexible interior and exterior body parts such as bumper covers, air dams, and other similar auto trim. These parts require a good combination of stiffness, impact resistance, and tensile strength. Some body parts require a lower stiffness than can be obtained without impairing other properties.

When used as an automotive exterior body part, paint should readily and durably adhere to the body part, so there is little visible difference between the painted part and the other painted portions of a vehicle. As a general rule, however, TPO compositions are difficult to paint, since most paints do not adhere well to ethylene and propylene based polymers.

A number of attempts have been made to externally modify these TPOs to improve their painting characteristics without sacrificing the important structural properties of the part. For example, the use of primers such as chlorinated polyolefins and electronic surface treatments have met with some success in solving the painting problem; however, these methods are also very expensive and time consuming.

An olefin high polymer modified by an ethylene/acrylic acid copolymer is described in U.S. Pat. No. 3,410,928 where the copolymer is used to improve adhesion, printability, grease resistance, and stress crack resistance. The copolymer is broadly defined to also include, among other things, terpolymers and multipolymers including many olefinically unsaturated esters, ethers, glycols, ketenes, and so forth. Acrylates and acrylic acids are also broadly disclosed as "copolymer" components, but there is no distinction made among the listed comonomers for physical property changes other than adhesion. The improvement of flexural modulus with good paint retention properties is not recognized. While molding is speculatively mentioned, there is no selection of comonomers and blend components to provide improvement in physical properties.

Also, a wide variety of blend components have been added to TPOs in an attempt to improve paint receptivity of the molded part. These blend components include, for example, various ethylene/acrylate and ethylene/unsaturated carboxylic acid copolymers used in combination with polypropylene and a copolymer of polypropylene as described in published PCT International Application WO86/04192, which is incorporated by reference herein for all purposes. While these components form generally satisfactory TPO's, they yield a higher flexural modulus than those compositions of the present invention as described below.

SUMMARY OF THE INVENTION

The present invention, therefore, provides a TPO blend especially well-suited for use as a flexible automotive body part and other like applications requiring reduced flexural modulus while maintaining good impact resistance and tensile strength. The present invention also provides a TPO blend showing improved paint adhesion.

In accordance with the present invention, there is provided a paintable TPO which, in its overall concept, comprises a blend of a polyolefin as the continuous phase with an ethylene/acrylate/acrylic acid ("E/A-/AA") terpolymer as the dispersed phase. The acrylates useful in this invention are lower alkyl; i.e., containing one to four carbon atoms, esters and include methacrylates. Methyl acrylate is particularly preferred. The term acrylic acid includes methacrylic acid.

The polyolefins are generally polymers of one or more olefins, more preferably polypropylene and copolymers of propylene and/or ethylene, optionally with minor amounts of higher alpha-olefins, diolefins and other well-known comonomers. Such polyolefins and their production are well-known.

The terpolymer of this invention comprises a random copolymer of ethylene, a lower alkyl acrylate, and an acrylic acid. The terpolymer has an acrylate content of from about 4% to about 30%, and an acrylic acid content of from about 3% to about 10%, by weight based upon the weight of the E/A/AA terpolymer with the remainder being ethylene. The E/A/AA terpolymer is preferably produced by well-known free radical initiated polymerization methods.

The polyolefin and E/A/AA terpolymer may be blended, formed, or otherwise mixed by any one of a number of suitable methods to produce the paintable TPO compositions having reduced flexural modulus of the present invention.

The resulting TPO blend is from about 60 wt % to about 90 wt % polyolefin and from about 10 wt % to about 40 wt % terpolymer which may then be molded, extruded or formed by any well-known method to produce various parts for a desired end application, particularly molded to produce automobile body parts where reduced flexural modulus is particularly important, as long as the paintability remains good and other physical properties are not unduly sacrificed.

These and other features and advantages of the present invention will be more readily understood by those skilled in the art from a reading of the following detailed description.

DETAILED DESCRIPTION OF THE PREFERRED EMBODIMENTS

The moldable TPOs of the present invention comprise, in their overall concept, a blend of polyolefins as the continuous phase with an E/A/AA terpolymer as the dispersed phase. These molded TPO products have many applications where good paint retention and reduced flexural modulus is desired without unduly compromising physical properties such as tensile and impact resistance strength. This is particularly important to the production of certain molded auto parts which must be strong, flexible to minimize crash damage, and retain paint to remain attractive and appealing without peeling. Molded parts, utilizing the TPO of this invention based on E/A/AA terpolymers will have a flexural modulus on the order of about 20% lower than obtained using TPO's made with ethylene/acrylate or ethylene acrylic acid copolymers or a mixture of the two.

Paint adhesion, as measured by peel strength, is maintained or improved over prior art compositions based on ethylene/ acrylate or ethylene/acrylic acid copolymers or a mixture of the two.

In preferred embodiments, the TPO blend comprises from about 60 wt % to about 90 wt %, preferably from about 70% to about 85%, of the polyolefin, and from about 10% to about 40%, preferably from 15% to 30%, by weight, of the E/A/AA terpolymer. Other known additives such as, for example, talc and degradation inhibitor, known in the art, may be included.

Suitable polyolefins are polypropylene, copolymers of ethylene and propylene, polyethylene, and polymers obtained from ethylene and/or propylene copolymerized with minor amounts of other olefins, particularly C4 to C12 olefins. Polypropylene, ethylene/propylene rubbers, and polyethylene are preferred.

The E/A/AA terpolymer, as mentioned before, comprises a random copolymer of ethylene, a lower alkyl acrylate, particularly methyl acrylate, and an acrylic acid. The acrylate and acrylic acid, in the singular, refer to both a single form and combinations of different forms of the compounds.

In the preferred embodiment, the E/A/AA terpolymer comprises an acrylate content of from about 4% to about 30%, more preferably from about 5% to about 25%, by weight, based on the weight of the E/A/AA terpolymer. The E/A/AA terpolymer also comprises an acrylic acid or methacrylic acid content of from about 3% to about 10%, preferably 4.5% to 8%, by weight, based on the weight of the E/A/AA terpolymer. The rest of the terpolymer is, of course, ethylene.

The E/A/AA terpolymer may comprise a wide range of melt indexes (MI), generally between about 0.1 to about 30, more preferably between about 1 to about 10, dg/min (ASTM D1238, Condition E).

Acrylates useful in the present invention are lower alkyl (meth)acrylate esters. Lower alkyl as used in describing this invention means those alkyl groups having from one to four carbon atoms. The preferred lower alkyl acrylate is methyl acrylate.

The E/A/AA terpolymer may be produced by any one of a number of well-known free radical initiated processes such as, for example, those described in U.S. Pat. No. 3,350,372 which is incorporated by reference for all purposes as if fully set forth. Generally ethylene, the (meth)acrylates and the (meth)acrylic acids are metered into, for example, a high pressure autoclave reactor along with any one of a number of well-known free radical polymerization initiators (catalysts) suitable for producing ethylene and acrylic based polymers. Particularly preferred catalysts include organic peroxides such as, for example, lauroyl peroxide, di-tert butyl peroxide, tert butyl peroxide and various azo compounds. Typically, the catalyst will be dissolved in a suitable organic liquid such as benzene, mineral oil, or the like. Ordinarily the catalyst is used at a level of between about 50 to about 20000, more preferably between about 100 to about 250, ppm based on the weight of monomers.

The polyolefins and E/A/AA terpolymer may be blended, formed, or otherwise mixed by any one of a number of suitable methods to produce the TPO blends of the present invention. For example, the TPO blend may be produced by melt mixing in one or more stages the polyolefin and terpolymer, within the ranges described above, under intense mixing conditions at a temperature between about 175° C. to about 250° C. for a time sufficient to ensure that the components are adequately integrated. Additionally, more than one type or form of the polyolefin and/or terpolymer may be concurrently utilized. This melt mixing can be accomplished in, for example, a Banbury mixer, Farrel Continuous mixer, single screw extruder, twin screw extruder or the like. The time of mixing required is well-known, depending upon the mixer used. The resulting blend may be pelletized or otherwise processed for future use, particularly as for the molding or paintable auto body parts where reduced flexural modulus is important.

The composition used in the practice of this invention, particularly the preferred embodiments, accomplishes just such a desired result; i.e., improved auto body parts.

The polyolefins, E/A/AA terpolymer and/or blend may, if desired, include one or more other well-known additives such as, for example, antioxidants, ultraviolet absorbers, antistatic agents, release agents, pigments, colorants, or the like; however, this should not be considered a limitation of the present invention.

The foregoing more general discussion of this invention will be further exemplified by the following specific examples offered by way of illustration and not limitation of the above-described invention.

EXAMPLES

In the following examples, property evaluations were made in accordance with the following tests:
(1) Secant Flexural Modulus--ASTM D-790.
(2) Tensile Properties--ASTM D-638.
(3) Elongation--ASTM D-638.
(4) Notched Izod Impact--D-256.
(5) Melt Flow Rate--ASTM D-1238, Condition L.
(6) Melt Index--AD-1238, Condition E.
(7) Paintability Properties--plaques of each tested composition, as listed below in Table I, measuring approximately 4.5"×9"×1/8" were molded in a 300 ton Watson-Stillman injection machine. The molding characteristics of the polyolefins of this invention were observed to be those usually found in molding typical TPO parts. Each plaque was alkaline washed then painted with a white, universal coat/clear coat system commercially available from PPG Industries, Inc. Prior to painting, some of the plaques were painted with an adhesion promoter commercially available from Bee Chemical under the trade designation HP-21054-4B1. The painted plaques were then conditioned for 72 hours at room temperature and tested in accordance with Fisher Body's Material Specification (FBMS) 1-38.

Materials were utilized in the examples described below:

(A) Escorene PD 7032G--a medium impact polypropylene copolymer having an MFR of about 4 dg/min, available from Exxon Chemical Company, Houston, Texas.

(B) Vistalon ECA 8232--a commercial ethylene/propylene copolymer elastomer having an ethylene content of about 67% by weight and a Mooney viscosity of about 32 (1+4, 125° C.), available from Exxon Chemical Company, Houston, Texas.

(C) Optema EMA XS1WS--an ethylene/methyl acrylate copolymer having a methyl acrylate content of about 10% by weight and a 6 dg/min MI, available from Exxon Chemical Company, Houston, Texas.

(D) Primacor 3440--a commercial ethylene/acrylic acid copolymer having an acrylic acid content of about 9% by weight, available from Dow Chemical Company, Midland, Michigan.

(E) HDPE SS55-060--a commercial high density polyethylene having a density of about 0.955 g/cc and a 6 dg/min MI.

(F) Talc.

(G) Irganox 1010--a commercial phenolic inhibiter from Ciba-Geigy Corporation.

(H) Terpolymer--an ethylene/methyl acrylate/acrylic acid terpolymer with a methyl acrylate content of about 6% by weight, an acrylic acid content of about 5% by weight and a melt index of 5 dg/min, with the balance being ethylene. This terpolymer was produced as described above.

EXAMPLES I AND II

Example I is a typical TPO compound as taught by PCT WO86/04192 except that the acrylic copolymer component is an E/A/AA terpolymer instead of EAA copolymer. Example II is similar to Example I but contains twice the relative amount of E/A/AA terpolymer (30 wt %).

COMPARATIVE EXAMPLES

Comparative Examples C1, C2, and C3 use ethylene/methyl acrylate copolymer (nominally 10% methyl acrylate), ethylene/ acrylic acid copolymers (nominally 9% acrylic acid), and a 1:1 blend of these two copolymers (yielding an equivalent level of about 5% methyl acrylate and about 4.5% acrylic acid), respectively and the same concentration of acrylic copolymers used in Example I (15% of TPO Blend). Comparative Example C4 contains the same level of acrylic polymers as Example II, but uses a 1:1 blend of copolymers as used in Comparative Example C3.

The components of all blends tested were mixed in a 1 D Banbury for four (4) minutes. After mixing test specimens for measuring physical properties and 40 plaques to study paintability were molded with each blend over a 300 ton Watson-Stillman injection machine. The 40 test plaques measured about 4.5"×9"×1/8".

TABLE I

| Component (wt %) | | 1 | 2 | C1 | C2 | C3 | C4 |
|---|---|---|---|---|---|---|---|
| H | (E/MA/AA) | 15 | 30 | — | — | — | — |
| A | (P/P Impact Copolymer) | 50 | 40 | 50 | 50 | 50 | 40 |
| B | (E/P Elast.) | 20 | 15 | 20 | 20 | 20 | 15 |
| C | (E/MA) | — | — | 15 | — | 7.5 | 15 |
| D | (E/AA) | — | — | — | 15 | 7.5 | 15 |
| E | (HDPE) | 10 | 10 | 10 | 10 | 10 | 10 |
| F | (Talc) | 5 | 5 | 5 | 5 | 5 | 5 |
| G | (inhibiter), pph | 0.1 | 0.1 | 0.1 | 0.1 | 0.1 | 0.1 |

| PHYSICAL PROPERTIES | | | | | | |
|---|---|---|---|---|---|---|
| Secant Flexural Modulus, kpsi | 54.0 | 55.9 | 78.8 | 74.9 | 75.3 | 67.4 |
| Tensile Strength @ Yield, psi | 1960 | 2045 | 2275 | 2320 | 2230 | 2275 |
| Elongation @ Yield, % | 50 | 50 | 40 | 40 | 40 | 45 |
| Izod Impact, ft.lb/in | | | | | | |
| @ 21 C, Notched | NB* | NB | NB | NB | NB | NB |
| @-20 c, Notched | NB | NB | NB | NB | NB | NB |
| Peel Strength, lbs/in | 1.15 | 0.77 | 0.24 | 0.8 | 0.39 | 0.94 |

*NB = No Break

The TPO products representing this invention (Examples 1 and 2) exhibit significant reduction in flexural modulus and improvement in elongation while experiencing only a minor reduction in tensile strength and no change in the Izon impact at test conditions.

The physical property results of Comparative Examples C1, C2, and C3 are similar. This shows no change in properties for TPO's based on EMA, EAA, or a 1:1 blend of the two. All three Comparative Examples contain nominally the same amount of polymer units derived from acrylic monomers (e.g., C1 contains 1.5% methyl acrylate; C2, 1.4% acrylic acid; C3, 0.8% methyl acrylate, 0.7% acrylic acid)

Example 1 contains nominally the same amount of polymer units derived from acrylic monomers as Comparative Examples C1, C2, and C3 (0.9% methyl acrylate and 0.7% acrylic acid), but unexpectedly has lower (−29%) flexural modulus, improved (+25%) elongation, only slightly (−15%) lower tensile strenght, and no change in impact strength.

Example 2 compares similarly favorably to Comparative Example C4. Note that in Example 1, the Peel Strength is superior for the painted auto part.

Many modifications and variations besides the embodiments specifically mentioned may be made in the compositions and methods described herein without substantially departing from the concept of the present invention. Accordingly, it should be clearly understood that the form of the invention described herein is exemplary only, and is not intended as a limitation on the scope thereof.

We claim:

1. A molded part having good paint adhesion and a lowered Secant Flexural Modulus molded from a thermoplastic polyolefin composition consisting essentially of from 70 wt % to 85 wt % polypropylene and ethylene/propylene copolymer elastomer and from 15 wt % to 30 wt % of a terpolymer consisting essentially of ethylene, 5 wt % to 25 wt % methyl acrylate and 4.5 wt % to 8 wt % acrylic acid.

2. The part of claim 1 is a molded auto body part.

3. A thermoplastic polyolefin exhibiting good paint adhesion and having a reduced flexural modulus and improved elongation comprising:

(A) as a continuous phase, a blend of from about 60 to about 90 parts by weight of (1) propylene polymer and (2) ethylene-propylene copolymer elastomer; and (B) as a dispersed phase from about 10 to about 40 parts by weight of an ethylene/lower alkyl acrylic acid terpolymer wherein said terpolymer comprises from about 4% to about 30% by weight of a lower alkyl acrylate, and from about 3% to about 10% by weight of acrylic acid with the balance of said terpolymer being ethylene.

4. The paintable thermoplastic polyolefin of claim 3, wherein said dispersed phase is a terpolymer comprising from 5% to about 25% by weight of methyl acrylate, from 4.5% to 8% by weight of acrylic acid, and ethylene, and having a melt index of about 4 to about 6.

5. The thermoplastic polyolefin of claim 3 wherein the continuous phase is from 70 parts to 85 parts by weight of (1) a copolymer of propylene and an (2) ethylene/propylene copolymer elastomer.

6. The thermoplastic polyolefin of claim 3 wherein the terpolymer contains from 5% to 25% by weight methyl acrylate.

7. The thermoplastic polyolefin of claim 6 wherein the terpolymer contains from 4.5% to 8% by weight acrylic acid.

8. The thermoplastic polyolefin of claim 5 wherein the continuous phase includes from about 8% to about 12% by weight high density polyethylene.

9. The thermoplastic polyolefin of claim 3 wherein the terpolymer has a melt index of from about 1 to about 10 dg/min.

10. The thermoplatic polyolefin of claim 3 wherein said propylene polymer of said continuous phase comprises polypropylene.

11. The thermoplatic polyolefin of claim 10 wherein said polypropylene is an impact polypropylene copolymer.

* * * * *